(12) United States Patent
Furman et al.

(10) Patent No.: US 7,556,743 B2
(45) Date of Patent: Jul. 7, 2009

(54) NANOCOMPOSITES AND METHODS FOR SYNTHESIS AND USE THEREOF

(75) Inventors: Benjamin R. Furman, San Antonio, TX (US); Stephen T. Wellinghoff, San Antonio, TX (US); Paul M. Thompson, San Antonio, TX (US); H. Ralph Rawls, San Antonio, TX (US)

(73) Assignees: Southwest Research Institute, San Antonio, TX (US); The Board of Regents, The University of Texas System, Austin, TX (US)

( * ) Notice: Subject to any disclaimer, the term of this patent is extended or adjusted under 35 U.S.C. 154(b) by 502 days.

(21) Appl. No.: 11/369,129

(22) Filed: Mar. 6, 2006

(65) Prior Publication Data

US 2007/0205394 A1    Sep. 6, 2007

(51) Int. Cl.
*C09K 19/00* (2006.01)
*C09K 19/06* (2006.01)
*C09K 19/52* (2006.01)

(52) U.S. Cl. ............... 252/299.01; 252/299.5; 430/20; 428/1.1; 428/315.5; 428/323; 428/411.1; 428/500

(58) Field of Classification Search ............ 252/299.01, 252/299.5; 430/20; 428/1.1, 315.5, 323, 428/411.1, 500
See application file for complete search history.

(56) References Cited

U.S. PATENT DOCUMENTS

| 6,194,481 | B1 | 2/2001 | Furman et al. ............ 522/77 |
| 6,270,846 | B1 | 8/2001 | Brinker et al. ........... 427/385.5 |
| 6,387,981 | B1 | 5/2002 | Zhang et al. ............ 523/117 |
| 7,090,788 | B2 * | 8/2006 | Elliott .................. 252/299.01 |
| 2002/0013382 | A1 | 1/2002 | Furman et al. ............ 522/90 |
| 2002/0156152 | A1 | 10/2002 | Zhang et al. ............ 523/115 |
| 2003/0191205 | A1 | 10/2003 | Markowitz et al. ........ 521/99 |
| 2006/0027723 | A1 | 2/2006 | Wu ..................... 248/346.01 |

FOREIGN PATENT DOCUMENTS

WO    WO 03/077340    9/2003

OTHER PUBLICATIONS

M. Rodrigues, D. Petri, M. Politi, S. Brochztain; "Zirconium Phosphate/1,4,5,8-Naphthalenediimides Self-Assembled Films," An. Aca. Bras. Ci., No. 72 (1), 2000, pp. 75-78.

S. Stockhause, P. Neumann, S. Schrader, M. Kant, L. Brehmer; "Structural and optical properties of self-assembled multilayers based on organic zirconium bisphosphonates," Synthetic Metals, 127, 2002, 295-98.

M. Petruska, G. Fanucci, D. Talham; Organic/Inorganic Langmuir-Blodgett Films Based on Metal Phosphates: Preparation and Characterization of Phenoxy- and Biphenoxy-Substituted Zirconium Phosphate Films, Chem. Materials, No. 10, 1998, 177-89.

A. Clearfield, J. Stynes; Organically Pillared Micropous Zirconium Phosphates, J. Chem. Soc., Dalton trans., 2002, pp. 2937-2947.

G. Alberti, M .Casciola, R. Palombari; "Inorganic-organic proton conducting membranes for fuel cells and sensors at medium temperatures," Journal of Membrane Science, 2000, No. 172, p. 233-239.

G. Alberti, E. Giontella, S. Murcia-Mascaros, R. Vivani; "Mechanism of the Topotactic Formation of Gamma-Zirconium Phosphate Covalently Pillared with Diphosphonate Groups," Inorg. Chem., No. 37, 1998, pp. 4672-4676.

G. Alberti, E. Giontella, S. Murcia-Mascaros, R. Vivani; "Mechanism of the Formation of Organic Derivatives of Gamma-Zirconium Phosphate by Topotactic Reactions with Phosphonic Acids in Water and Water-Acetone Media," Inorg. Chem., No. 36, 1997, pp. 2844-2849.

C. Dejugnat, F. Al Ali, K. Vercruysse-Moreira, G. Etemad-Moghadam, I. Rico-Lattes; "Self-Organization Properties of New (a-Aminoalkyl)phosphonic- and (a-Aminoalkyl)phosphonocarboxylic Acid Amphiphiles in Water and at the Air/Water Interface," Langmuir, No. 18, 2002, pp. 10168-10175.

M. Diem, D. Burow, J. Fry; "Oxonium Salt Alkylation of Structurally and Optically Labile Alcohols," J. Org. Chem., vol. 42, No. 10, 1977, pp. 1801-1802.

P. Jaffres, V. Caignaert, D. Villemin; "A direct access to layered zirconium-phosphonate materials from dialkylphosphonates," Chem. Commun. 1999, pp. 1997-1998.

G. Ozin, S. Oliver; "Skeletons in the Beaker: Synthetic Hierarchical Inorganic Materials," Advanced Materials, vol. 7, No. 11, 1995, pp. 943-946.

G. Klose, A. Petrov, F. Volke, H. Meyer, G. Forster, W. Rettig; "Self-Assembly and Phase Behavior of Short Chain Phosphonic Acid-Water Systems in al Wide Concentration Range," Mol. Cryst. Liq. Cryst., vol. 88, 1982, pp. 109-126.

(Continued)

*Primary Examiner*—Geraldina Visconti
(74) *Attorney, Agent, or Firm*—Gifford, Krass, Sprinkle, Anderson & Citkowski, P.C.

(57) ABSTRACT

Nanocomposite compositions and methods of synthesis of the compositions are described. In particular, liquid crystal-functionalized nanoparticles, liquid crystal-templated nanoparticles, nanocomposite compositions including the nanoparticles, and composite compositions including the nanocomposites are detailed.

24 Claims, No Drawings

OTHER PUBLICATIONS

H.J. Sue, K.T. Gam; "Epoxy Nanocomposites Based on the Synthetic a-Zirconium Phosphate Layer Structure," Chem. Matter, No. 16, 2004, pp. 242-249.

H.J. Sue, K.T. Gam, N. Bestaoiu, A. Clearfield, M. Miyamoto, N. Miyatake;"Fracture Behavior of a-Zirconium Phosphate-Based Epoxy Nanocomposites," Acta Materialia, No. 52, 2004, pp. 2239-2250.

R. Corriu, D. Leclercq, P. Mutin, L. Sarlin, A. Vioux; "Nonhydrolytic sol-gel to layered metal (IV) and silicon phosphonates," J. Mater. Chem. vol. 8, No. 8, 1998, pp. 1827-1833.

A. Clearfield, R. Blessing, J. Stynes; "New Crystalline Phases of Zirconium Phosphate Possessing Ion-Exchange Properties," J. Inorg. Nucl. Chem., vol. 30, 1968, pp. 2249-2258.

A. Clearfield, J. Stynes; "The Preparation of Crystalline Zirconium Phosphate and Some Observations on its Ion Exchange Behaviour," J. Inorg. Nucl. Chem., vol. 26, 1964, pp. 117-129.

D.M. Poojary, B. Zhang, and A. Clearfield; "Synthesis and crystal structure of a new layered zirconium phosphate compound , $Zr(PO_4)F(OSMe_2)$," J. Chem. Soc., Dalton Trans., 2453 (1994).

* cited by examiner

NANOCOMPOSITES AND METHODS FOR SYNTHESIS AND USE THEREOF

GRANT REFERENCE

The U.S. government has certain rights in this invention pursuant to grant number NIDCR PO1 DE 11688.

FIELD OF THE INVENTION

The invention relates to nanocomposite compositions, as well as methods of synthesis of the compositions. In particular, the invention relates to liquid crystal-functionalized nanoplatelets, liquid crystal-templated nanoplatelets, nanocomposite compositions comprising said nanoplatelets, and composite compositions comprising said nanocomposites.

BACKGROUND OF THE INVENTION

Thermosetting polymers have myriad uses in various industries including aerospace and electronics industries as well as in the manufacture of consumer products. In particular, thermosets have the properties of being durable and relatively resistant to environmental stressors such as heat, microorganisms, and water. As a result, thermosetting polymers have found wide ranging uses as coatings; adhesives; construction components such as for crack repair, bonding and grouting; and in medical and dental applications such as in bone cements and implants.

However, thermosetting polymers are often highly crosslinked, adding to stability but increasing brittleness. Dental polymers are prime examples of highly crosslinked, brittle thermosets. Linear polymers can serve as highly effective thermoplastic toughening agents in brittle thermosetting resins (Hodgkin et al., Thermoplastic toughening of epoxy resins: a critical review, Polymers for Advanced Technologies, 9:3-10, 1998). Unfortunately, the inclusion of thermoplastics into such polymers can reduce their elastic modulus at the same time that they enhance ductility.

Similarly, it is often advantageous to include other components in a thermosetting polymer which add desired characteristics to a thermosetting polymer composition. For example, a radiopaque filler is often desirable in a composition including a thermosetting polymer. Radiopacity is useful in numerous fields of use, such as in medical and dental applications where radiography is often used to investigate the status of implanted material. However, such fillers are often incompatible with the polymer. For instance, zirconium offers a significant source of radiopacity in dental composite formulations of thermosetting polymers. Unfortunately, zirconium oxide particles and other metal containing particles have proven difficult to disperse homogeneously into organic resins.

Thus, there is a continuing need for improved polymer composite and nanocomposite compositions, toughening agents and methods for their synthesis.

SUMMARY OF THE INVENTION

A process for producing a layered organo-metal nanoparticle is provided according to an embodiment of the present invention which includes providing a plurality of liquid crystal monomers, providing a source of metal ions, placing the plurality of liquid crystal monomers and the source of metal ions in a reaction vessel under reaction conditions sufficient to form a liquid crystal structure including the plurality of liquid crystal monomers; and reacting the metal ions and the functional group of the plurality of liquid crystal monomers to form a bond between the metal ions and the functional group of the plurality of liquid crystal monomers yielding a lamellar organo-metal nanoparticle. The liquid crystal monomers each include an organic mesogen and a functional group. The modified liquid crystal monomers each have a long axis, the long axis having a first terminus and a second terminus. The functional group is bonded to the first terminus.

In a preferred option, the source of metal ions includes a metal selected from an alkaline earth metal, a transition metal and a combination of these. Such transition metals are exemplified by hafnium, tantalum, tungsten, and a combination thereof. In a further preferred embodiment, the source of metal ions includes zirconium. For instance, a metal salt such as $ZrOCl_2$ is a source of metal ions.

In a preferred embodiment, the nanoparticle includes a layered zirconium phosphonate.

A functional group X forming part of a liquid crystal monomer R—X is an oxygen-containing moiety in a particular option, and the bond between the metal ions and the functional group of the plurality of liquid crystal monomers is a bond between the metal and an oxygen atom of the oxygen-containing moiety. Illustrative functional groups include an oxygen-containing moiety such as a phosphate, a phosphonate, a dimethyl sulfoxide complex of a phosphate, a dimethyl sulfoxide complex of a phosphonate, and a salt of any of these. In one embodiment, a liquid crystal monomer is a liquid crystal monomer phosphonate.

A liquid crystal monomer optionally further includes one or more moieties such as a bridging molecule, a miscibility moiety, and a reactive group.

A nanoparticle included in one embodiment of an inventive composition has an average particle size in the range of 1-1000 nanometers. In further embodiment, an inventive nanoparticle has an average particle size in the range of 5-500 nanometers. In a preferred embodiment, the nanoparticle is a nanoplatelet. Such a nanoplatelet has a lateral dimension in the range of 5-1000 nanometers and a thickness in the range of 5-100 Angstroms A nanoparticle composition is described which includes a plurality of organic liquid-crystal monomers bound to a lamellar metal-containing nanoparticle. A preferred lamellar metal-containing nanoparticle includes a transition metal. A further preferred metal-containing nanoparticle includes zirconium. In some embodiments, the metal containing nanoparticle includes an alkaline earth metal. Optionally, the plurality of organic liquid crystal monomers includes a plurality of thermotropic organic liquid crystal monomers. In a further option, the plurality of organic liquid crystal monomers includes a plurality of organic lyotropic liquid crystal monomers.

A process for producing a layered organo-metal nanoparticle according to the invention is detailed which includes providing an exfoliated suspension of nanoparticles, the nanoparticles each having a first ion exchange group; providing a plurality of liquid crystal monomers, the liquid crystal monomers each having an organic mesogen and a terminal ion exchange group, the liquid crystal monomers each having a long axis, the long axis having a first terminus and a second terminus, wherein the terminal ion exchange group is bonded to the first terminus. Further described is mixing the nanoparticle suspension and the plurality of modified liquid crystal monomers to create a reaction mixture and exposing the reaction mixture to ion exchange reaction conditions such that ion exchange occurs between the first ion exchange group of the nanoparticles and the terminal ion exchange group of the liquid crystal monomers, creating bonds between the nanoparticles and the liquid crystal monomers, yielding a lamellar liquid crystal-functionalized nanoparticle.

In a preferred option, first ion exchange group and the terminal ion exchange group are each independently selected from the group consisting of: a phosphate, a phosphonate, a halophosphate, a halophosphonate, a dimethylsulfoxide complex of a phosphate, a dimethylsulfoxide complex of a phosphonate, and a salt of any of these.

In a further preferred option, the nanoparticle suspension includes a zirconium phosphonate. Another preferred option according to the invention is described in which the nanoplatelet suspension includes $\gamma$-$ZrPO_4(O_2P(OH)_2)$.

A nanocomposite composition is provided invention which includes a thermoplastic material and a layered organo-metal nanoparticle according to an embodiment of the invention. Additionally, a curable composition is provided which includes a thermosetting material and a nanocomposite including a thermoplastic material and a layered organo-metal nanoparticle. Optionally, the ratio of thermosetting material to toughening agent is in the range of 10:0.01-1:1, inclusive. Further optionally, the ratio of thermosetting material to toughening agent is in the range of 10:0.1-1:0.5, inclusive.

A polymer composite composition according to an embodiment of the invention is described which includes an interpenetrating network having a thermosetting polymer component and a toughening agent component wherein the toughening agent component includes a nanocomposite having a thermoplastic material component and a layered organo-metal nanoparticle component.

DETAILED DESCRIPTION OF THE INVENTION

Layered organo-metal particles are provided according to the present invention as well as methods for their production. Such particles have various uses, for instance as fillers in polymer compositions.

In a particular embodiment, inventive particles are a component of a polymer nanocomposite formulated as a toughening agent. An inventive toughening agent includes a layered organo-metal particle and a thermoplastic polymer.

An inventive composite polymer composition is provided which includes a toughening agent and a thermosetting polymer. Desirable characteristics of a composite polymer are enhanced in a composition of the invention, such as increasing ductility, increasing elastic modulus and plastic strain hardening. In addition, an inventive toughening agent provides radiopacity, while remaining translucent or transparent, thereby facilitating light activated processes such as photopolymerization, photocuring and/or photoinitiation. Advantageously, in one formulation, an inventive toughening agent confers radiopacity to an inventive composite without interfering with the translucency or transparency of such a composite composition.

A layered organo-metal particle according to an embodiment of the invention may be a lamellar liquid crystal-templated nanoparticle or a lamellar liquid crystal-functionalized nanoparticle. Each of these types of layered organo-metal particle may include a lamellar organic liquid crystal structure bonded to one or more nanoparticles.

Nanoparticles which form part of a layered organo-metal particle incorporate metal ions or atoms. Preferred specific metals include an alkaline earth metal and/or a transition metal. An exemplary alkaline earth metal is barium. Exemplary transition metals are hafnium, tantalum and tungsten. A particularly preferred metal for radio-opacity is zirconium.

Further preferred are nanoparticles including a lamellar zirconium phosphate and/or a zirconium phosphonate.

Nanoparticles included in inventive compositions preferably have a mean particle size in the range of 1-1000 nanometers. Further preferred are nanoparticles having a mean particle size in the range of 0.5-500 nanometers. Nanoparticles are preferably in the form of platelets. Such platelets typically have a lateral dimension in the range of 5-1000 nanometers, preferably in the range of 10-100 nanometers and a thickness in the range of 5-100 angstroms, preferably in the range of 5-50 angstroms.

A lamellar liquid crystal structure included in an inventive layered organo-metal particle is formed from organic liquid crystal monomers. In a particular embodiment, a liquid crystal monomer has a chemical structure represented by the symbol "R" where R is preferably a molecule having a long axis and which includes a calamitic mesogen, a first terminus at one end of the long axis and a second terminus at a second end of the long axis. A calamitic mesogen included in a liquid crystal monomer may be an amphiphilic or nonamphiphilic mesogen and thus suitable liquid crystal monomers may be lyotropic and/or thermotropic liquid crystal monomers, which are known synonomously as liquid crystal precursors. Such calamitic mesogens are known in the art and any of the various known organic calamitic mesogens may be used in a composition according to the invention.

It is appreciated that a combination of two or more mesogens is optionally included in a liquid crystal monomer.

For use in a process of forming a lamellar organo-metal nanoparticle, a liquid crystal monomer R includes a moiety X bonded to a terminus to form a liquid crystal monomer having the formula R—X. The symbol X in this formula is either: 1) a functional group for reaction with a metal containing compound to form a bond between the functional group and the metal in a method of producing a liquid crystal-templated nanoparticle, or 2) X is an ion exchange group for ion exchange reaction with a second ion exchange group in a method for producing a liquid crystal-functionalized nanoparticle, the second ion exchange group bonded to a metal in a metal-containing nanoparticle.

The moiety X is preferably an oxygen-containing moiety such as a polyoxyphosphorus moiety, illustratively including a phosphate group, a phosphonate group, dimethylsulfoxide complexes thereof, or a salt of any of these.

Preferably, a liquid crystal monomer R—X further includes one or more moieties for enhancing desirable properties of a monomer for use in inventive compositions and methods. Such moieties illustratively include: a miscibility group selected to enhance miscibility of the monomers with a thermoplastic material and/or a thermosetting material included in an inventive nanocomposite and/or composite composition; a bridging moiety selected to increase the long axis of a monomer; and a reactive group selected to react with a thermoplastic material and/or a thermosetting material included in an inventive composition.

Enhancement of miscibility may be used to increase homogeneity of a curable composite composition. For example, physical interaction of a host polymer and a liquid crystal monomer portion of a layered organo-metal particle in a toughening agent composition and/or composite composition of the invention enhances miscibility of the polymer and particle. Such physical interaction includes, for instance, dipole/dipole interactions.

In particular, introduction of functional groups in a liquid crystal monomer may allow for such interaction with a thermoplastic material. For example, where a thermoplastic material includes polar ester functions, such as are present in polycaprolactone, introduction of ether or ester groups to a liquid crystal monomer aids in miscibility. The identity of such a miscibility group selected to enhance miscibility of the monomers with another component of an inventive composition will depend on the identity of the other components of the composition. Inclusion of a miscibility group for enhancing miscibility is known in the art and selection of a suitable group may be made by one of ordinary skill in the art without undue experimentation.

A miscibility group present in a liquid crystal monomer R—X is bonded to one or more atoms of the long axis of the monomer such that the miscibility group forms part of the long axis or is pendant therefrom. In one embodiment, a miscibility group is present at a second terminus of the monomer. In other preferred embodiments, a miscibility group may be located elsewhere, for instance, between a mesogen and the moiety X.

In a further option, a liquid crystal monomer R—X includes one or more bridging moieties, for instance in order to extend the linear dimension of the monomer. Such a bridging moiety is preferably a $C_1$-$C_{30}$ moiety, preferably straight chain, but optionally branched, alkyl moiety which may be substituted or unsubstituted, saturated or unsaturated. Optionally, a non-carbon atom may be included in the $C_1$-$C_{30}$ backbone, illustratively including an oxygen, nitrogen, sulfur, and phosphorus. A bridging molecule optionally includes one or more pendant moieties pendant from the $C_1$-$C_{30}$ backbone. A pendant moiety may be included to enhance miscibility of an inventive nanoparticle with a thermoplastic and/or thermosetting material in one embodiment. Such a pendant moiety may be the same as a miscibility group or different. In a further embodiment, a reactive pendant moiety may be included which is polymerizable and/or cross-linkable to form a bond to a thermoplastic material and/or thermosetting material for instance.

A bridging moiety is bonded to one or more atoms of the long axis of the monomer such that the bridging moiety forms part of the long axis in a preferred embodiment. A bridging moiety may be located for instance, between a mesogen and the moiety X, between a mesogen and a miscibility group, between a terminal reactive group and mesogen, between a miscibility group and a mesogen, and/or other position within the liquid crystal monomer.

In a further option, a reactive group is present as part of the liquid crystal monomer, preferably at a terminus, for reaction with a reactive group present on a thermoplastic or thermosetting material, further described below. Suitable reactive groups include nucleophiles and groups comprising at least one electron deficient alkene. Suitable nucleophiles include ester groups, organic acid groups, amine groups, hydroxyl groups, and sulfhydryl groups. More preferred reactive groups comprise electron deficient alkenes. Preferred electron deficient alkenes independently are selected from the group consisting of substituted and unsubstituted alkenyl ester groups comprising a polymerizable unsaturated carbon-carbon bond, wherein said alkenyl group has from about 2 to about 12 carbon atoms. Preferred alkenyl esters are acryloyl groups and methacryloyl groups, said substituted alkenyl ester groups comprising at least one halogen atom selected from the group consisting of chorine atoms, bromine atoms, and iodine atoms. Optionally, a reactive group is pendant from the long axis of the liquid crystal monomer.

In a preferred embodiment of a process of producing a lamellar liquid crystal-templated nanoparticle, liquid crystal monomers are included to achieve a mobile lamellar ordering in organic solution without crystallizing. In order to achieve this mobile lamellar ordering in organic solution, a mixture of two or more liquid crystal monomers R—X may be used in one embodiment. For example, two or more liquid crystal monomers having differing structure may be included in order to suppress crystallization.

Liquid crystal monomers are synthesized using any suitable method. A preferred method for synthesizing one type of liquid crystal monomer suitable for use in the present invention is described in U.S. patent application Ser. No. 10/190,470.

Diagram 1 depicts an exemplary liquid crystal monomer R—X to illustrate a described liquid crystal monomer and embodiments of inventive processes incorporating such monomers to produce a layered organo-metal nanoparticle according to the invention.

(1)

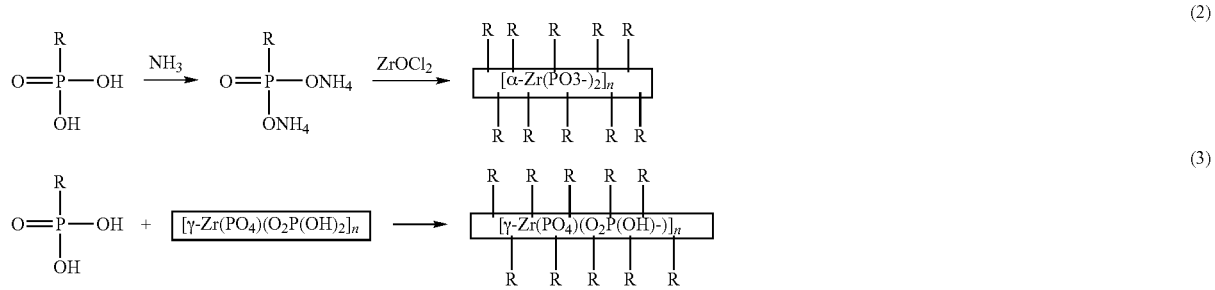

An exemplary liquid crystal monomer R—X is shown at (1) in Diagram 1. The exemplary monomer R—X is shown in two schematic examples of inventive processes for producing a layered organo-metal nanoparticle. Shown at (2) is a schematic example of a liquid crystal templating process for producing a layered organo-metal nanoparticle. Shown at (3) is a schematic example of an ion exchange process for producing a layered organo-metal nanoparticle.

Processes for Producing a Lamellar Liquid Crystal-Templated Nanoparticle

Processes are provided according to the present invention for production of a lamellar liquid crystal-templated nanoparticle. In particular, an inventive method for production of a lamellar liquid crystal-templated nanoparticle includes providing a plurality of liquid crystal monomers R—X having a terminal functional group X, the terminal functional group X capable of reaction with a metal containing compound to form a bond between the functional group X and the metal. The liquid crystal monomers are placed in a reaction vessel, optionally with a solvent, at concentrations and under conditions sufficient to produce a liquid crystal structure. Conditions for producing a liquid crystal structure from liquid crystal monomers in solution are known in the art and depend on solution concentration, temperature, and composition.

In one example of forming a liquid crystal structure, liquid-crystal-forming ammonium phosphonate monomers (containing approximately 5 wt. % of water) are dissolved together in a solution of toluene (approximately 50 wt. %) at 60° C. to form a lyotropic liquid crystal phase, i.e. a phase which spontaneously organizes as a lamellar liquid crystal structure based on solution concentration, temperature, and composition.

A metal ion source is brought into contact with the liquid crystal structure under reaction conditions which allow bonding between a metal and the terminal functional groups present on the lamellar liquid crystal structure to yield a liquid crystal-templated nanoparticle in which a lamellar liquid crystal structure is bonded to one or more nanoparticles.

A metal ion source reacted with a liquid crystal monomer R—X having a terminal functional group X includes a metal salt, preferably an alkaline earth metal and/or a transition metal salt capable of reaction with a terminal functional group on a lamellar liquid crystal structure to form a bond between a metal atom in the metal salt and the terminal functional group. A metal salt used as a source of metal ions may be an inorganic salt or an organic salt. A preferred inorganic metal salt includes an oxyanion, such as an oxychloride, oxynitrate, or phosphate. Further exemplary metal salts useful in synthesis of a liquid crystal-templated nanoparticle include alkaline earth metal and transition metal sulfates, nitrates, chlorides, and acetates. Exemplary organic salts include carboxylates, carbonates, diketonates and alkoxides.

In a particularly preferred embodiment, a liquid crystal-templated nanoparticle composition is produced in a single step process. For example, a single phase mixture is generated including a liquid crystal monomer having a terminal functional group. The single phase mixture may further include an amount of water in the range of about 1-20 weight percent relative to the weight of the monomers. Also preferably included in the single phase mixture is an organic solvent. The organic solvent is typically included in an amount in the range of about 30-80 weight percent relative to the monomer/water components. The single phase mixture is then brought into contact with the metal ion source, i.e. an aqueous or organic solution of metal complexes. These components are preferably reacted in a single step to form a liquid crystal-templated nanoparticle.

Thus, the single phase mixture is mixed with a solution containing the metal ion source to form a two phase mixture. The metal complex diffuses into the liquid crystalline single-phase mixture and reacts with it. This is a two phase reaction, with metal complexes diffusing into the liquid-crystal-forming system and byproducts diffusing out of it. The original solution of metal complexes is therefore not required to combine in a single phase with the nanoplatelet forming phase.

The two phase mixture has a ratio of metal ions to the liquid crystal forming monomers of at least about 1:2. However, in practice, an excess of metal species is included in order to ensure that the reaction proceeds to completion. Mechanical mixing is employed to increase the contact area within the two phase reaction.

In a particular example of such a single step process, a quantity of liquid crystal monomers having terminal phosphonate groups are placed in a toluene solution and mixed with a saturated aqueous solution of zirconyl chloride ($ZrOCl_2$) causing immediate precipitation of zirconium containing nanoplatelets bound to a liquid crystal structure through the phosphonate groups, thus producing an inventive lamellar liquid crystal-templated nanoplatelet composition.

In general, phosphonate moieties cannot be reacted with metal ions, such as zirconium ions, to give a lamellar structure suitable for exfoliation. Rather, the reaction of a phosphonate, typically a phosphonic acid, and metal ions, such as zirconium ions produced from $ZrOCl_2$, will give an amorphous material that is of little value as a dental material or in other applications where layered crystalline structure is desirable. (P.-A. Jaffrès, V. Caignaert, and D. Villemin, "A direct access to layered zirconium-phosphonate materials from dialkylphosphonates," Chemical Communications, pp. 1997-1998 1999.) In particular, a layered crystalline structure is advantageous in applications in which radiopacity is desirable simultaneous with transparency or translucency of the material to other forms of radiation, such as light. Surprisingly, it is found that a process of the present invention allows formation of highly ordered liquid crystal-templated nanoparticle structures. In particular, this application discloses liquid crystal structures that are "lamellar," i.e. structured with a 2-dimensional layered ordering. Ordered in a lamellar fashion, the liquid crystal monomers are linked together, or "bridged," by metal cations bound to more than one liquid crystal monomer, resulting in a layered metal phosphonate structure, that is, a lamellar liquid crystal-templated nanoparticle.

In a preferred embodiment a structure including lamellar $Zr(PO_3R)_2$, is produced in situ in an advantageous morphology by forming a lamellar liquid crystal phase of a liquid crystal monomer phosphonate in a suitable organic solvent, such as toluene. The polar phosphonate head groups are reacted within the interlamellar phosphonate domains with a concentrated source of metal cations, such as a saturated aqueous $ZrOCl_2$ solution, to form the metal phosphonate and thus $Zr(PO_3R)_2$, an exemplary layered organo-metal nanoparticle. Byproducts such as water and ammonium salts may be removed by vacuum, for example.

Processes for Producing a Lamellar Liquid Crystal-Functionalized Nanoparticle

In another embodiment of an inventive process for producing a lamellar organo-metal nanoparticle a liquid crystal monomer is bound to a nanoparticle by ion exchange to produce a liquid crystal-functionalized nanoparticle. In such an embodiment, a nanoparticle is provided for use in an ion exchange reaction to produce a liquid crystal-functionalized nanoparticle. A provided nanoparticle includes a metal bound to an ion exchange group. The ion exchange group is preferably an oxygen-containing moiety such as a polyoxyphosphorus moiety, illustratively including a phosphate group, a phosphonate group, a dimethylsulfoxide complexes thereof, or a salt of any of these.

Nanoparticles which form part of a layered organo-metal particle are metal containing particles. In particular, preferred metals included in the particles are an alkaline earth metal and/or a transition metal. An exemplary alkaline earth metal is barium. Exemplary transition metals include hafnium, tantalum and tungsten. A particularly preferred metal included in a metal containing nanoparticle is zirconium.

Nanoparticles included in inventive compositions preferably have a mean particle size in the range of 1-1000 nanometers. Further preferred are nanoparticles having a mean particle size in the range of 5-500 nanometers. Nanoparticles are preferably in the form of platelets. Such platelets typically have a lateral dimension in the range of 5-1000 nanometers, preferably in the range of 10-100 nanometers and a thickness in the range of 5-100 angstroms, preferably in the range of 5-50 angstroms.

Highly preferred nanoparticles including metals having an ion exchange group are selected from the group consisting of γ-zirconium phosphate phosphonates and other layered zirconium phosphonates, such as α-zirconium phosphonate. Suitable zirconium phosphonates may be prepared using the procedure described in G. Alberti et al., Inorg. Chem., 36, 2844 (1997), incorporated herein by reference. $Zr(PO_4)F(OSMe_2)$ may be prepared using the procedure described in "Synthesis and crystal structure of a new layered zirconium phosphate compound, $Zr(PO_4)F(OSMe_2)$, D. M. Poojary, B. Zhang and A. Clearfield, J. Chem. Soc., Dalton Trans., 2453 (1994).

In an embodiment of an inventive process, binding of a liquid crystal monomer to a nanoparticle is accomplished by ion exchange. For example, a liquid crystal-functionalized nanoplatelet is produced by forming a reaction mixture comprising a nanoplatelet having a first ion exchange group X', and a liquid crystal monomer R—X, X being a second ion exchange group, wherein the first and second ion exchange groups are ion exchanged to produce a liquid crystal monomer bound to a nanoparticle.

A provided nanoparticle having a first ion exchangeable group is preferably provided as an exfoliated nanoplatelet suspension, particularly, a nanoplatelet colloid. Such a suspension is mixed with a liquid crystal monomer having an ion exchangeable terminal group to create a reaction mixture. The reaction mixture is exposed to ion exchange reaction conditions effective to induce ion exchange between the first functional groups and the second functional groups.

A provided exfoliated suspension is produced, for instance, by adding an exfoliating solvent to a metal compound having an ion exchangeable group to produce a nanoplatelet colloidal suspension. The process of exfoliation involves the creation of nanoplatelets and their separation of layered, or "pillared," into isolated suspension. The suspension is considered "colloidal" because these individually isolated nanoplatelets are of a colloidal size, that is, having a mean particle size in the range of 1-1000 nanometers. The original layered crystals are typically not colloidal in size prior to exfoliation. Generally, a suitable exfoliating solvent is a polar solvent, illustratively including water; a ketone, such as acetone, methyl ethyl ketone, and diethyl ketone; an amide such as formamide, and dimethylformamide; dioxane, dimethyl sulfone, dimethyl sulfoxide, dibutyl oxide; and a combination of any of these. Exemplary preferred exfoliating solvents are aqueous solutions of ketones, such as acetone. A preferred exfoliating solvent is aqueous acetone including about 40-90 volume % acetone in water, preferably about 80 volume % acetone in water. Further details of producing an exfoliated suspension may be found in G. Alberti et al., Inorg. Chem., 36, 2844 (1997).

A preferred exfoliated suspension nanoparticle material includes $\gamma$-$ZrPO_4(O_2P(OH)_2)$.

An exemplary scheme for synthesis of a liquid crystal functionalized nanoplatelet is shown in Diagram 1. In particular, Diagram 1 shows an exemplary scheme (3) in which $\gamma$-$ZrPO_4(O_2P(OH)_2)$, is functionalized with a liquid crystal monomer by substituting $O_2P(OH)_2$— with an organic phosphonate, $RO_2POH$—, where R is a liquid crystal monomer, by an ion-exchange reaction.

In an example of an ion exchange reaction, Diagram 1 shows an exemplary liquid crystal monomer R—X having a terminal functional group X which is an organophosphate group. The organophosphate on the liquid crystal monomer R—X is hydrolyzed to a phosphonic acid group. The organic phosphonate is hydrolyzed to phosphonic acid by addition of a dealkylating agent, followed by water. Suitable dealkylating agents include, but are not limited to, trimethyl silyl bromide. Following dealkylation, the resulting silyl phosphoester is hydrolyzed to yield a liquid crystal monomer having a terminal phosphonic acid group.

In one example of a process for producing an inventive layered organo-metal nanoparticle, an exfoliating mixture including zirconium phosphonate groups is mixed with the liquid crystal monomer having a terminal phosphonic acid group to produce a mixture which is subjected to conditions effective to induce a topotactic phosphoric-phosphonate replacement reaction. In a particular embodiment, reaction conditions include reaction in an aqueous organic medium. An example of a preferred aqueous organic medium includes a medium of 30-90% acetone in water. Typically reaction temperature is elevated over room temperature, in the range of about 30-100° C., for instance, preferably in the range of about 60-95° C. Typical reaction times are in the range of about 1 minute to several days. The phosphonic acid groups on the liquid crystal are ion-exchanged with the activated zirconium phosphonate groups, producing a reaction product including liquid crystal-functionalized nanoplatelets having the liquid crystal bonded to the zirconium via the phosphonate.

Nanocomposite Compositions

A toughening agent nanocomposite composition is provided according to the invention which includes a thermoplastic polymer and an inventive layered organo-metal nanoparticle. An inventive toughening composition may include an inventive layered organo-metal nanoparticle in the form of a lamellar liquid crystal templated nanoparticle and/or a lamellar liquid crystal-functionalized nanoparticle.

A thermoplastic polymer included in an inventive composition is a polymer which softens when heated and hardens again when cooled. A thermoplastic polymer included in an inventive composition may be any of various thermoplastic polymers, illustratively including polystyrenes; polyolefins such as polyethylenes and polypropylenes; acrylics; polyesters, such as polycaprolactones; fluoroplastics; polyacetals; polyacrylonitriles; polyamides; polyamide-imides; polyaryletherketones; polybutadienes; polybutylene; polycarbonates; polyphthalamides; polysulfones; polyvinylchlorides; polyvinylidene chlorides; and combinations thereof. A thermoplastic polymer may be provided as a polymer and/or in an oligomeric or monomeric polymerizable form for later polymerization. A thermoplastic polymer and an oligomer and monomer polymerizable to make a thermoplastic polymer are referred to herein as a thermoplastic material.

In a preferred embodiment, a thermoplastic material is a liquid crystal monomer R including one or more reactive groups for polymerization of the thermoplastic material.

In one embodiment, a liquid crystal monomer included as a thermoplastic material in an inventive composition is a linear monomer and/or oligomer polymerizable via reaction of reactive groups to form a linear polymer. Such a linear liquid crystal monomer may be a difunctional monomer, including a first reactive group $R_2$ at a first terminus and a second reactive group $R_3$ at a second terminus. The reactive groups at the first and second termini may be the same or different. In one embodiment, the reactive groups at the first and second termini are different, in order to provide asymmetry in the polymer which suppresses crystallinity while maintaining a nematic state.

Suitable reactive groups include nucleophiles and groups comprising at least one electron deficient alkene. Suitable nucleophiles include ester groups, organic acid groups, amine groups, hydroxyl groups, and sulfhydryl groups. More preferred reactive groups comprise electron deficient alkenes. Preferred electron deficient alkenes independently are selected from the group consisting of substituted and unsubstituted alkenyl ester groups comprising a polymerizable unsaturated carbon-carbon bond, wherein said alkenyl group has from about 2 to about 12 carbon atoms. Preferred alkenyl esters are acryloyl groups and methacryloyl groups, said substituted alkenyl ester groups comprising at least one halogen atom selected from the group consisting of chorine atoms, bromine atoms, and iodine atoms.

A liquid crystal monomer R may further include a bridging moiety and/or miscibility group as described above.

In a preferred option, a liquid crystal monomer R is included in a thermoplastic material which is part of an inventive toughening agent. In a further preferred option, a liquid crystal monomer R included in a toughening agent as a thermoplastic material is the same liquid crystal monomer R as used to make a layered organo-metal nanoparticle included in the toughening composition, although the terminal group X is optionally omitted in this context.

Preferably, the liquid crystal monomers included in an inventive toughening agent exhibit very little or no polymerization shrinkage. In a preferred embodiment, the liquid crystal monomers exhibit polymerization shrinkage of about 3 vol % change or less, most preferably 2 vol % change or less. Examples of such suitable low- or zero-polymerization shrinkage liquid crystal monomers include elongated mesogens, randomly substituted mesogens, mesogenic dimers, and the like, described in U.S. Pat. No. 6,258,974, and co-pending U.S. patent application Ser. No. 10/057,548, U.S. patent application Ser. No. 10/057,506, U.S. patent application Ser. No. 10/056,121, and U.S. patent application Ser. No. 10/190,470.

Liquid crystal monomers are synthesized using any suitable method. A preferred method for synthesizing one type of liquid crystal suitable for use in the present invention is described in U.S. patent application Ser. No. 10/190,470.

In a preferred process of producing a nanocomposite, an inventive layered organo-metal nanoparticle is formed in the presence of a thermoplastic material. In an alternative option, a layered organo-metal nanoparticle may be formed and then mixed with a thermoplastic material to form an inventive nanocomposite.

Thus, in one process for producing an inventive toughening agent, a thermoplastic material is mixed with liquid crystal monomers and a metal salt to produce a reaction mixture. The reaction mixture is incubated to produce a lamellar liquid crystal-templated nanoparticle having a thermoplastic material occupying the interlamellar spaces (also known as "galleries") between the ordered monomers. Thus, in such a process, nanoplatelets are grown in situ within the desired ductile ("thermoplastic") matrix, termed thermoplastic material herein. In such a configuration nanoplatelets, already containing polymer within the galleries, have no need of further exfoliation. They are already "intercalated" by the thermoplastic material creating a new hybrid organic-inorganic thermoplastic nanocomposite.

In one example of in situ formation of an inventive toughening agent, a metal ion source and a plurality of liquid crystal monomers are provided, along with a thermoplastic material. In a preferred embodiment, the thermoplastic material is provided in a liquid or semi-liquid state or heated to render the thermoplastic material liquid or semi-liquid, such that the material may be mixed with other components. The liquid crystal monomers, thermoplastic material, and metal ion source are mixed, yielding a nanocomposite which is a miscible mixture of a liquid crystal-templated nanoparticle and thermoplastic material.

In a further specific example, liquid-crystal-forming ammonium phosphonate monomers, containing approximately 5 wt. % water, are dissolved together in a solution of toluene (approximately 50 wt. %) at 60° C. to form a liquid crystal phase, i.e. a phase which spontaneously organizes as a lamellar liquid crystal structure based on solution concentration, temperature, and composition. In a particular example of such a single step process, a quantity of liquid crystal monomers R—X, where X is a terminal phosphonate group, are placed in a toluene solution and mixed with a saturated aqueous solution of zirconyl chloride ($ZrOCl_2$) causing immediate precipitation of zirconium containing nanoplatelets bound to a liquid crystal through the phosphonate group, thus producing an inventive lamellar liquid crystal-templated nanoplatelet. A thermoplastic material, such as flowable polycaprolactone may be added to the lamellar liquid crystal-templated nanoplatelet to produce an inventive toughening agent.

In one embodiment, a thermoplastic material itself acts as an organic solvent for the liquid crystal monomers. Thus, for example, a thermoplastic material is provided as a polymer melt, such as flowable polycaprolactone. A composition including liquid-crystal-forming ammonium phosphonate monomers and approximately 15 wt. % water is added. If desired, the thermoplastic material may be plasticized with a small amount of solvent, such as toluene, to reduce the viscosity of a lamellar phase of the material. A precipitation reaction with saturated aqueous zirconyl chloride is carried out in the presence of the molten polymer while the temperature is maintained above the melt point of the thermoplastic material. As the nanoplatelets precipitate, they are incorporated directly into the polymer melt, resulting in an optically translucent organic/inorganic hybrid thermoplastic nanocomposite. Such a nanocomposite may be used in various ways including as a material for forming articles of manufacture and as a material for use in conjunction with another polymer. For instance, an inventive nanocomposite may be formulated as a "toughening agent" in a composite composition with a thermosetting polymer in order to provide desirable properties to the composite.

Where the thermoplastic material is a monomer or oligomer polymerizable to make a thermoplastic polymer, the thermoplastic material may be polymerized at the time of liquid crystal-templated nanoparticle formation or later.

As noted above, a lamellar liquid crystal templated nanoparticle may be formed in situ in the presence of liquid crystal monomers for forming a thermoplastic matrix. Optionally in such an embodiment, a liquid crystal monomer portion R which forms part of a lamellar liquid crystal templated nanoparticle includes a reactive group such that the lamellar liquid crystal templated nanoparticle may be reacted to form a bond to one or more molecules of the thermoplastic material. For example, a zirconium phosphonate nanoparticle bonded to a liquid crystal which includes a polymerizable group in the form of a terminal alkene is formed in the presence of a polymerizable thermoplastic material having reactive groups for polymerization, such as a dialkene thermoplastic monomer. By such a method a ceramic reinforcing phase is formed directly in the nanocomposite in a dispersed form. Subsequent polymerization of the phosphonate alkene functional reactive terminal groups into the crosslinking difunctional thermoplastic monomer may then be performed. The functional alkene groups assure that the zirconium phosphonate forms a separate, ductile continuous phase interdispersed with the dialkene monomer which will lead to mechanical reinforcement of the composite.

In one embodiment, a thermoplastic material includes a photopolymerizable liquid crystal monomer.

As noted above, in a preferred embodiment, a liquid crystal monomer preferably includes one or more functional groups for increasing miscibility of the liquid crystal functionalized platelet with a thermoplastic polymer. Thus an inventive liquid crystal-functionalized nanoplatelet is at least partially soluble in a thermoplastic polymer included in a toughening agent.

A curable composition is provided according to the invention which includes an inventive nanocomposite toughening agent and a thermosetting polymer. In a preferred embodiment, the toughening agent and the thermosetting polymer form an interpenetrating network in a cured form of the curable composition. Such a material may be used in any of a variety of applications, such as a dental material, and/or in articles of manufacture.

In one embodiment, a curable composition includes components for formation of a liquid crystal-templated nanoparticle, a thermoplastic material, and a thermosetting monomer such that a liquid crystal-templated nanoparticle is produced in the presence of constituents included in a curable composition.

Thus, for example, a plurality of liquid crystal monomers and a metal containing compound are provided along with thermosetting monomers, and thermoplastic material. Preferably, where the thermoplastic material is a thermoplastic polymer, it is provided in a liquid or semi-liquid state or heated to render the polymer liquid or semi-liquid, such that the polymer may be mixed with other components. The liquid crystal monomers, thermosetting monomers, thermoplastic material, and metal containing compound are mixed, yielding a curable composite which is a miscible mixture of a liquid crystal-templated nanoparticle, thermosetting monomers, and thermoplastic material.

In a preferred embodiment, the liquid crystal-templated nanoparticle, a thermoplastic material, and a thermosetting monomer are miscible such that the curable composition is a single phase composition. Thus, for instance, the thermosetting monomer preferably acts as a solvent and softener to mobilize the toughening agent, thereby making the entire mixture fluid. As the thermosetting monomer polymerizes, it simultaneously forms a brittle thermoset network and causes the segregation of the toughening agent that had been previously solvated by thermosetting monomer. Thus, curing the curable composition yields an interpenetrating network that includes both a brittle thermoset and the toughening agent.

A thermosetting polymer is a polymer which becomes hard or rigid upon curing and which does not become flowable upon application of heat, although some softening may occur. Thermosetting polymers illustratively include epoxy resins, allyl resins, phenolic resins, polyester resins, melamine-formaldehydes, polyimides, silicones, multifunctional acrylic resins, and polyurethane resins. Thermosetting material may be provided in the form of a curable flowable thermosetting polymer and/or in the form of thermosetting monomers and/or oligomers polymerizable to form a thermosetting polymer. A thermosetting monomer or oligomer included in an inventive composition may be any of various thermosetting monomers or oligomers polymerizable to yield a thermosetting polymer.

Further components may be included in a curable composite composition including a lubricant, diluent, hardener, filler, mold release agent, pigment, colorant, plasticizer, fire retardant, stabilizer, and the like.

The term "curable" as used herein is intended to mean capable of undergoing a physical change from a less viscous state to a more viscous state such as by polymerization, evaporation of solvent, and particularly, by cross-linking.

A curable composite composition may be cured by various methods such as by application of heat or light. Particularly preferred for use in dental applications is a photocurable composition. A curing agent, such as an initiator or catalyst, may be included in a curable composition.

In general, the ratio of thermosetting material to toughening agent in a curable composition is in the range of 10:0.01-1:1, inclusive. Preferably, the ratio of thermosetting material to toughening agent in a curable composition is in the range of 10:0.1-1:0.5, inclusive.

Embodiments of inventive compositions and methods are illustrated in the following examples. These examples are provided for illustrative purposes and are not considered limitations on the scope of inventive compositions and methods.

EXAMPLE

Example 1

Synthetic Preparation of Layered Zirconium Phosphonates by in-situ Templating on Amphiphilic Liquid Crystals Step 1

O-Alkylation of Brominated Primary Alcohols (Diem Method):

To a baffled (indented) 500 mL round-bottom flask, fitted with an inlet adapter, a condenser, a stopper, and a magnetic stir bar is added either trimethyloxonium tetrafluoroborate (10 g, 67 mmol) or triethyloxonium tetrafluoroborate (10 g, 53 mmol) under passing nitrogen. To the same flask is also added either 11-bromo-1-undecanol (recrystallized from diethyl ether) or 8-bromo-1-octanol (vacuum distilled) in an amount no greater than 0.9 molar equivalents of the O-alkylating agent. To the same flask is also added either 1,8-bis(dimethylamino)naphthalene (Proton-Sponge®, Aldrich) or tribenzylamine (Aldrich) in an amount equal to 1 molar equivalent of the O-alkylating agent. To the aforementioned dry powders is added dichloromethane (DCM, ca. 250 mL). The vessel is sealed under nitrogen backpressure, and the reactive mixture is stirred for 1 week at room temperature.

After the reaction, the solid and liquid contents of the flask are separated by vacuum filtration. The isolated DCM solution is washed one time against a 10% HCl solution and then reduced by rotary evaporation. The concentrated, cloudy oil is then redissolved in diethyl ether. The filtered cake—comprised mostly of organoammonium tetrafluoroborate salts—is rinsed with diethyl ether to recover additional product. Finally, the two ether solutions are recombined and filtered to achieve transparency.

The reaction mixture, now dissolved in diethyl ether, is washed firstly against aqueous sodium bicarbonate and secondly against saturated brine. The solution is then dried against sodium or magnesium sulfate and filtered. The volatile ether is removed as much as possible by rotary evaporation, and the resulting product is tested by small-plate thin-layer chromatography using diethyl ether as the eluent and iodine as the developer. TLC results: 11-bromo-1-undecanol, Rf=0.34; 1-methoxy-11-bromoundecane, Rf=0.69; 1-ethoxy-11-bromoundecane, Rf=0.66. The light transparent oil, 92% pure by $^1$H-NMR, is distilled under vacuum, 0.25 mm Hg, over a short path. Yield: 38-61%.

Step 2

Michaelis-Arbruzov Reaction of End-Brominated Alkyl Ethers:

After purification, 1-methoxy-8-bromooctane, 1-ethoxy-8-bromooctane, 1-methoxy-11-bromoundecane, and 1-ethoxy-11-bromoundecane, are reacted, respectively, with triethylphosphite. To a round-bottom flask is added one of the previously purified oils plus about 2 molar equivalents of freshly distilled triethylphosphite (TEP). In a typical reaction, about 10 grams of brominated material is reacted together with about 15 mL of TEP in a 50 mL round-bottom flask. The flask was fitted to a short-path distillation apparatus and heated in an oil bath to reflux, about 160° C., while stirring overnight under nitrogen backpressure. The collected ethyl bromide is removed and TEP is then collected by vacuum distillation, 0.25 mm Hg, over the short path. After removing TEP from the apparatus, the newly formed ethyl phosphoester is isolated in pure form by recovering the second of three fractions from a second vacuum distillation. Yield: 47-87%.

Step 3

Formation of Hydrolyzable Silyl Phosphoesters:

To each of four 25 mL flasks, attached to a four-takeoff cow-type receiver, is added 37 mmol of one of the four phosphonates generated in step 2. To a dropping funnel under nitrogen backpressure is transferred 23 mL of trimethylsilyl bromide (Aldrich). Using the dropping funnel, 5.75 mL (41 mmol, 1.1 equivalents) of the silane is added to each of the phosphoesters while stirring under nitrogen. The reaction is sealed and left to stir overnight.

Step 4

Hydrolysis of Silyl Phosphoesters to Phosphonic Acids:

The formed ethyl bromide byproduct and excess silane are both pumped away under progressively regulated vacuum. Each reaction pot is then quenched with 15 mL of 1.5N $NH_4OH$, resulting in pH=5-6. The quench is followed by rinsing with fresh water. Each material is dissolved in ca. 75 mL DCM and washed against a 5% aqueous HCl solution, resulting in the formation of a hazy emulsion. Each emulsion is clarified by the addition of diethyl ether, facilitating further separation. Each organic solution is reduced by rotary evaporation, resulting in a white waxy solid. In total, four waxes are isolated, and each is triple-recrystallized from boiling n-hexanes. Melt points: methoxyoctylphosphonic acid, 48° C.; ethoxyoctylphosphonic acid, 50° C.; methoxyundecylphosphonic acid, 72° C.; ethoxyundecylphosphonic acid, 69° C.

Step 5

Formation of Ammonium Salts from Phosphonic Acids:

Equal amounts of each of the four phosphonic acids prepared in steps 1-4 are weighed into a 100 mL round bottom flask. In a typical experiment, 1 gram of each acid is added. To the flask, containing a mixture of crystalline phosphonic acids, is added sufficient chloroform to completely dissolve the acids while stirring. To the stirred chloroform solution is added gaseous ammonia by delivery through a cannula. After 15 minutes of continuous bubbling, ammonia delivery is stopped. The resulting mixture of ammonium phosphonate salts is dried and weighed, indicating quantitative neutralization of the phosphonic acid starting mixture.

Step 6

Formation of a Lamellar Mixture of Ammonium Phosphonates:

A quantity of the ammoniated phosphonate mixture from step 5, e.g. 250 mg, is added to a sealed vessel along with low-molecular weight polycaprolactone. A small amount, about 15 weight %, of toluene is added to plasticize the crystalline polycaprolactone, and a small amount of water, about 5 weight %, is added to mobilize the phosphonate. The mixture is heated above the melting point of the polymer, about 60° C., to form a single dense, lamellar, optically birefringent, mobile phase.

Step 7

Formation of Zirconium Phosphonate Nanoplatelets within Polymer:

To the mobilized single-phase mixture of ammonium phosphonates, polycaprolactone, toluene, and water, is added a warmed saturated solution of zirconyl chloride by rapid injection. The components are stirred vigorously by vortex action while still warm and then allowed to cool, yielding a loose precipitate. Water-soluble salts are rinsed away, and the remaining material is heated under vacuum, at about 50° C., to allow coalescence of the precipitated powder. This results in the formation of a translucent wax, which could be cooled and reground for analytical purposes.

Any patents, publications or patent applications mentioned in this specification are incorporated herein by reference to the same extent as if each individual publication is specifically and individually indicated to be incorporated by reference.

The compositions and methods described herein are presently representative of preferred embodiments, exemplary, and not intended as limitations on the scope of the invention. Changes therein and other uses will occur to those skilled in the art. Such changes and other uses can be made without departing from the scope of the invention as set forth in the claims.

The invention claimed is:

1. A process for producing a layered organo-metal nanoparticle, comprising:
   providing a first phase comprising a plurality of liquid crystal monomers, the liquid crystal monomers each comprising an organic mesogen and a functional group, the liquid crystal monomers each having a long axis, the long axis having a first terminus and a second terminus, wherein the functional group is bonded to the first terminus;
   providing a second phase comprising a source of metal ions;
   placing a two-phase mixure of the plurality of liquid crystal monomers and the source of metal ions in a reaction vessel under reaction conditions sufficient to form a liquid crystal structure comprising the plurality of liquid crystal monomers; and
   reacting the metal ions and the functional group of the plurality of liquid crystal monomers to form a bond between the metal ions and the functional group of the plurality of liquid crystal monomers yielding a lamellar organo-metal nanoparticle.

2. The process of claim 1 wherein the source of metal ions comprises a metal selected from the group consisting of: an alkaline earth metal, a transition metal and a combination thereof.

3. The process of claim 2 wherein the transition metal is selected from the group consisting of: hafnium, tantalum, tungsten, and a combination thereof.

4. The process of claim 1 wherein the source of metal ions comprises zirconium.

5. The process of claim 1 wherein the source of metal ions is a metal salt.

6. The process of claim 5 wherein the metal salt is $ZrOCl_2$.

7. The process of claim 1 wherein the nanoparticle comprises a layered zirconium phosphonate.

8. The process of claim 1 wherein the functional group is an oxygen-containing moiety and the bond between the metal ions and the functional group of the plurality of liquid crystal monomers is a bond between the metal and an oxygen atom of the oxygen-containing moiety.

9. The process of claim 8 wherein the functional group is an oxygen-containing moiety selected from the group consisting of: a phosphate, a phosphonate, a halophosphate, a halophosphonate, a dimethylsulfoxide complex of a phosphate, a dimethylsulfoxide complex of a phosphonate, and a salt of any of these.

10. The process of claim 1 wherein the liquid crystal monomer further comprises a moiety selected from the group consisting of: a bridging molecule, a miscibility moiety, a reactive group, and a combination thereof.

11. The process of claim 1 wherein the nanoparticle has a particle size in the range of 1-1000 nanometers.

12. The process of claim 1 wherein the nanoparticle is a nanoplatelet.

13. The process of claim 1 wherein the nanoplatelet has a lateral dimension in the range of 5-1000 nanometers and a thickness in the range of 5-100 Angstroms.

14. A nanoparticle composition, comprising:
    a plurality of organic liquid-crystal monomers bound to a lamellar metal-containing nanoparticle, wherein the lamellar metal-containing nanoparticles comprise a metal selected from the group consisting of: hafnium, tantalum, tungsten and zirconium.

15. The nanoparticle composition of claim 14 wherein plurality of organic liquid crystal monomers comprises a plurality of thermotropic organic liquid crystal monomers.

16. The nanoparticle composition of claim 14 wherein plurality of organic liquid crystal monomers comprises a plurality of organic lyotropic liquid crystal monomers.

17. A process for producing a layered organo-metal nanoparticle, comprising:
    providing an exfoliated suspension of nanoparticles, the nanoparticles each having a first ion exchange group;
    providing a plurality of liquid crystal monomers, the liquid crystal monomers each comprising an organic mesogen and a terminal ion exchange group, the liquid crystal monomers each having a long axis, the long axis having a first terminus and a second terminus, wherein the terminal ion exchange group is bonded to the first terminus;
    mixing the nanoparticle suspension and the plurality of liquid crystal monomers to create a reaction mixture;
    exposing the reaction mixture to ion exchange reaction conditions such that ion exchange occurs between the first ion exchange group of the nanoparticles and the terminal ion exchange group of the liquid crystal monomers, creating bonds between the nanoparticles and the liquid crystal monomers, yielding a lamellar liquid crystal-functionalized nanoparticle.

18. The process of claim 17 wherein the first ion exchange group and the terminal ion exchange group are each selected from the group consisting of: a phosphate, a phosphonate, a halophosphate, a halophosphonate, a dimethylsulfoxide complex of a phosphate, a dimethylsulfoxide complex of a phosphonate, and a salt of any of these.

19. The process of claim 17 wherein the nanoparticle suspension comprises a zirconium phosphonate.

20. The process of claim 17 wherein the nanoplatelet suspension comprises $\gamma$-$ZrPO_4(O_2P(OH)_2)$.

21. The process of claim 17 wherein the liquid crystal monomer further comprises a moiety selected from the group consisting of: a bridging molecule, a miscibility moiety, a terminal reactive group, and a combination thereof.

22. A nanocomposite, comprising:
    a thermoplastic material; and
    a layered organo-metal nanoparticle according to claim 14.

23. A curable composition comprising:
    a thermosetting material, and
    a nanocomposite according to claim 22.

24. A polymer composite composition, comprising:
    an interpenetrating network having a thermosetting polymer component and a toughening agent component, the toughening agent component comprising a nanocomposite according to claim 22.

* * * * *

UNITED STATES PATENT AND TRADEMARK OFFICE
CERTIFICATE OF CORRECTION

PATENT NO. : 7,556,743 B2
APPLICATION NO. : 11/369129
DATED : July 7, 2009
INVENTOR(S) : Benjamin R. Furman et al.

It is certified that error appears in the above-identified patent and that said Letters Patent is hereby corrected as shown below:

Column 1, Lines 6-7 - delete text in lines 6-7 "The U.S. government has certain rights in this invention pursuant to grant number NIDCR PO1 DE 11688." and replace with --This invention was made with government support under grant no. DE011688 awarded by the National Institutes of Health. The government has certain rights in the invention.--

Column 17, Line 28 - delete the word "mixure" and insert --mixture--

Signed and Sealed this

Twenty-fifth Day of August, 2009

David J. Kappos
*Director of the United States Patent and Trademark Office*